US012592496B2

(12) United States Patent
Panait

(10) Patent No.: US 12,592,496 B2
(45) Date of Patent: Mar. 31, 2026

(54) MOUNTING SYSTEM FOR USE WITH AN ANTENNA ASSEMBLY

(71) Applicant: Global Invacom Ltd, Stevenage (GB)

(72) Inventor: Johann Panait, Pforzheim (DE)

(73) Assignee: Global Invacom Ltd, Stevenage (GB)

( * ) Notice: Subject to any disclaimer, the term of this patent is extended or adjusted under 35 U.S.C. 154(b) by 116 days.

(21) Appl. No.: 18/265,558

(22) PCT Filed: Nov. 29, 2021

(86) PCT No.: PCT/GB2021/053098
§ 371 (c)(1),
(2) Date: Jun. 6, 2023

(87) PCT Pub. No.: WO2022/123214
PCT Pub. Date: Jun. 16, 2022

(65) Prior Publication Data

US 2024/0030620 A1 Jan. 25, 2024

(30) Foreign Application Priority Data

Dec. 8, 2020 (GB) .................................... 2019268

(51) Int. Cl.
*H01Q 19/13* (2006.01)
*H01Q 1/12* (2006.01)

(52) U.S. Cl.
CPC ......... *H01Q 19/132* (2013.01); *H01Q 1/1228* (2013.01); *H01Q 1/1264* (2013.01)

(58) Field of Classification Search
CPC ... H01Q 19/132; H01Q 1/1228; H01Q 1/1264
See application file for complete search history.

(56) References Cited

U.S. PATENT DOCUMENTS

| | | | | |
|---|---|---|---|---|
| 5,929,817 A * | 7/1999 | Clark | H01Q 1/1235 343/714 |
| 7,050,012 B2 * | 5/2006 | Chen | H01Q 1/125 343/882 |
| 2017/0025726 A1 | 1/2017 | Gomi et al. | |

FOREIGN PATENT DOCUMENTS

| | | |
|---|---|---|
| CN | 205900801 U | 1/2017 |
| EP | 0788667 A1 | 8/1997 |
| FR | 2782847 A1 | 3/2000 |
| JP | 3553808 B2 * | 8/2004 |

* cited by examiner

*Primary Examiner* — Dimary S Lopez Cruz
*Assistant Examiner* — Austin M Back
(74) *Attorney, Agent, or Firm* — GableGotwals

(57) ABSTRACT

An apparatus and a method for securely mounting an antenna assembly with respect to a support means. The antenna assembly includes a mounting means, antenna dish, support arm and data processing means. The invention provides a support structure selectively configurable to provide support for the data processing means position with respect to the antenna dish and thereby allow subsequent processing of the received data to be retained at a preferred position for efficient data processing over time and thereby retain the quality of the data for an end user.

9 Claims, 5 Drawing Sheets

MOUNTING SYSTEM FOR USE WITH AN ANTENNA ASSEMBLY

CROSS-REFERENCE TO RELATED APPLICATIONS

Figure 1A:
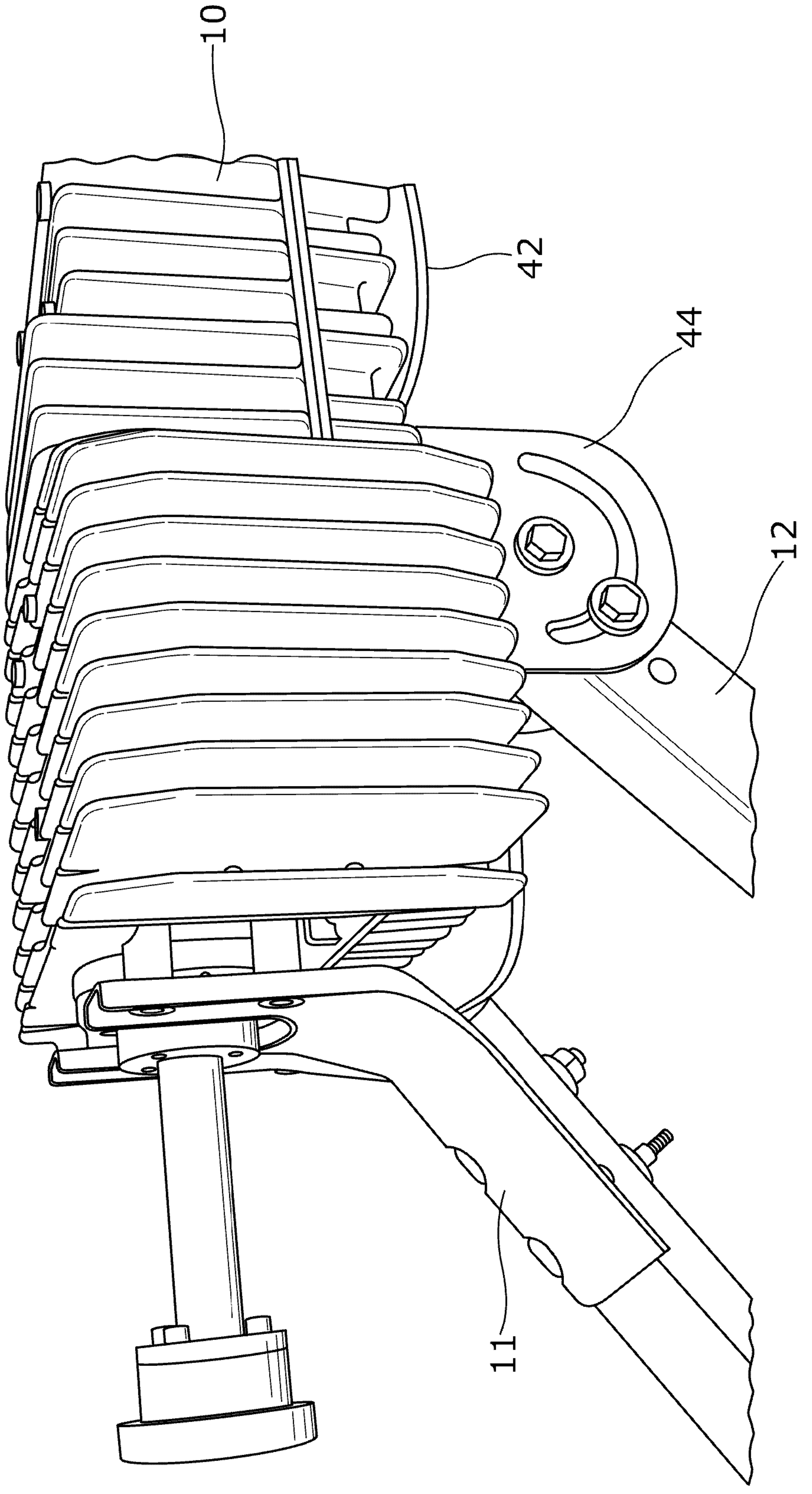

This United States application is the National Phase of PCT Application No. PCT/GB2021/053098 filed 29 Nov. 2021, which claims priority to British Patent Application No. 2019268.8 filed 8 Dec. 2020 which are incorporated herein by reference.

The invention to which this application relates is a mounting system for use particularly, although not necessarily exclusively, for the support of an antenna assembly of a type which is located with respect to a support means such as a substantially vertical wall surface, pole or a base such as on the ground surface.

The provision of an antenna assembly to receive broadcast data signals, such as those transmitted by satellite transmission systems, is well known and, typically, at each premises which is to receive the signals. an antenna assembly needs to be mounted to the support surface. Also, during the installation procedure the antenna dish is required to be directed to an orientation in order to allow the most efficient reception of the data signals, which are typically transmitted from one or more "head ends" via one or more satellites and the antenna assembly is required to be retained in the selected orientation during subsequent use so as to maintain the operating parameters of the apparatus. Conventionally, the antenna assembly comprises the antenna dish mounted on a bracket and an arm is provided and at, or adjacent to, the end of the arm remote from the antenna dish, data processing means are mounted which may include, for example, a Low Noise Block (LNB), waveguide and feed horn.

The bracket is located with the support means and while this allows the antenna assembly to be located in position it is found that the weight of the data processing components located on the arm can mean that in certain instances the arm is required to be of a relatively heavy fabrication, which adds to the expense of the assembly, and/or if the arm, and support therefore, is not sufficiently strong, the arm may twist, bend and/or be relatively flexible and this can mean that the position of the data processing components with respect to the antenna dish will change and so the optimum operation of the apparatus is not achieved and there may be increased error rates in the data which is received and processed.

Furthermore, as the mounting location of the antenna assembly is at the rear of the dish then the whole weight of the antenna assembly is therefore required to be supported from the rear and so, if relatively heavy data processing apparatus is located at the free end of the arm there is a significant tendency for movement of the said arm and hence position of the data processing components especially in poor environmental conditions such as with high wind loading.

These are problems which make the subsequent adjustment of the position of the antenna assembly to ensure efficient reception of the data signals difficult to achieve. Further problems can also be caused by relative movement of the components such that even when the adjustment of the antenna dish to the required orientation has been achieved, there may still be subsequent movement which can mean that the optimum adjustment position is lost.

It will therefore be appreciated that the installation of the antenna assembly can be difficult to achieve accurately and this lack of accuracy can have an adverse effect on the subsequent performance of the assembly, the quality of the data signals which are received and, ultimately, the quality of the service provided to the end user.

In order to overcome these problems it is known from earlier patents and patent applications to provide systems which can be used to adjust the orientation of the antenna with respect to the mounting means but typically the proposed known solutions are specific to particular forms of antenna assembly and require various different mounting bracket arrangements to be used and incorporated into the assembly in order to allow the position of the data processing components to be accurately positioned.

An aim of the present invention is to provide an antenna assembly which is of a form to reduce or remove the aforementioned problems.

In a first aspect of the invention there is provided apparatus including an antenna assembly including an antenna dish and mounting means therefore, data processing components located at a selected position in front of said antenna dish in order to allow the receipt of data signals reflected from said antenna dish and processing of the same and the said data processing means are located with respect to a support arm and wherein the apparatus further includes a support structure in engagement with the said data processing components and/or support arm and support means for the antenna assembly so as to provide support for the position of the support arm and the data processing components located thereon.

In one embodiment said support structure is located with respect to a support means which engages with the mounting means for the antenna assembly.

In one embodiment the support structure is located on the said support means so as to be adjustable independently of said mounting means.

In one embodiment when the said antenna assembly mounting means are engaged with the support means, the support structure is adjustable to allow the location and retention of the position of the data processing means at an optimum position with respect to the antenna dish to be achieved.

In one embodiment the said support structure includes first and second spaced apart members. Typically the said support structure includes third and fourth members depending outwardly from the first member and diverging so as to intersect at a location at which an adjustment mechanism, is provided.

Typically, extending from the said adjustment mechanism is a locator for the said data processing means and/or support arm. Typically the said locator is provided on a first side of the adjustment mechanism and the first, third and fourth members are provided to the opposing side of the adjustment mechanism.

In one embodiment the support structure is adjustable with respect to at least two axes. In another embodiment the adjustment is possible with respect to three axes.

Typically the first and second members are provided at fixed locations on the said support means and adjustment is possible between the first, and third and fourth members, respectively. Typically at the adjustment mechanism, relative sliding movement between the second member and the adjustment mechanism, and hence the third and fourth members is possible, Typically the support structure includes locking means at least at the adjustment mechanism which allows the support structure, once adjusted to the required position for subsequent use, to be locked in that position.

In one embodiment the antenna assembly includes adjustment means to allow the antenna dish orientation to be adjusted, and then fixed with respect to the mounting means.

In one embodiment the said data processing components include any, or any combination, of a waveguide, Low Noise Block, Block up converter, transceiver and/or feedhorn.

In one embodiment the said arm engages with one or more of the data processing components and/or said locator of the support structure.

In one embodiment the support means is any, or any combination of a pole, base, ground surface or other fixed object.

In a further aspect of the invention there is provided a method of mounting an antenna assembly with respect to a support means, said antenna assembly including a mounting means, said method comprising the steps of locating the support means surface at the required position, attaching the mounting means to the support means, and wherein a support structure is located with said support means and locating at, or adjacent to, one end of the said support structure, data processing components of the antenna assembly for processing data signals received by the antenna dish of the antenna assembly which are reflected to the data processing components and the said support structure is adjustable so as to allow the location of the data processing components with respect to the antenna dish to be selected so as to enable the efficient reception of data signals from the antenna dish and locking the position of the support structure so as to retain the position of the data processing components.

In one embodiment the said support structure is located to the support means at two spaced apart locations and adjustment of the position of the data processing means with respect to said support is achieved via relative adjustment of the support structure at an adjustment mechanism.

Figure 1B:
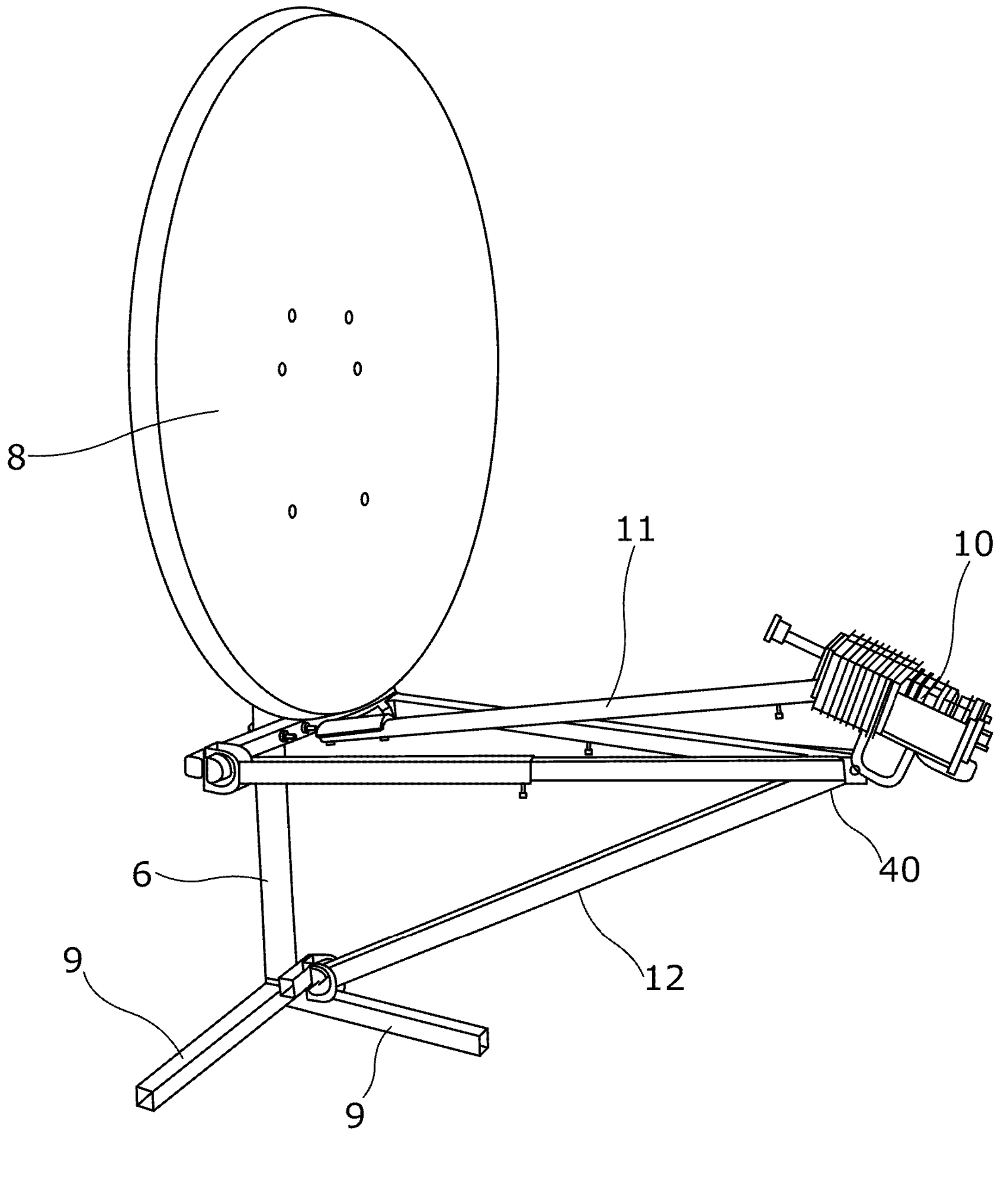
Figure 1C:
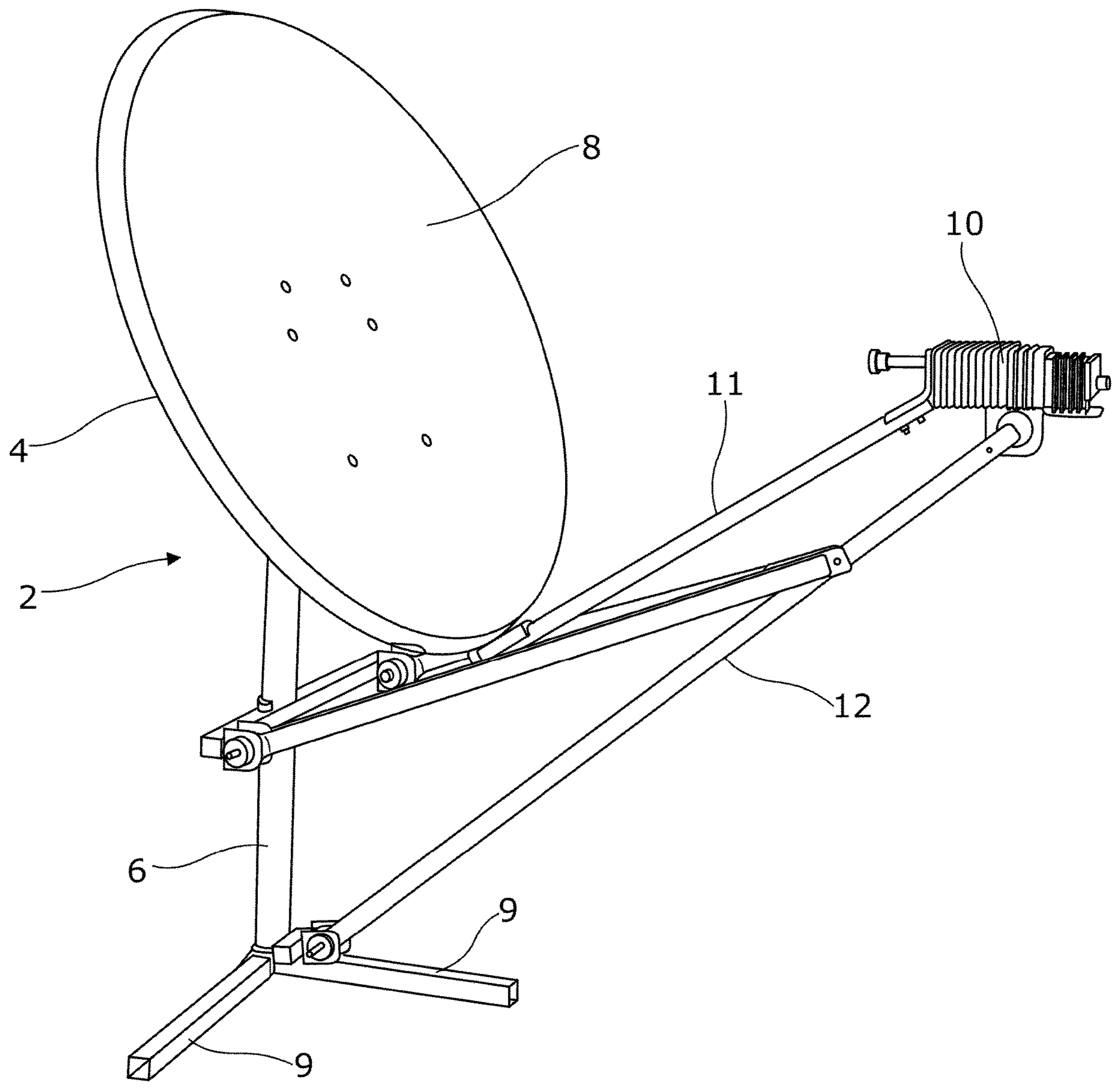
Figure 1D:
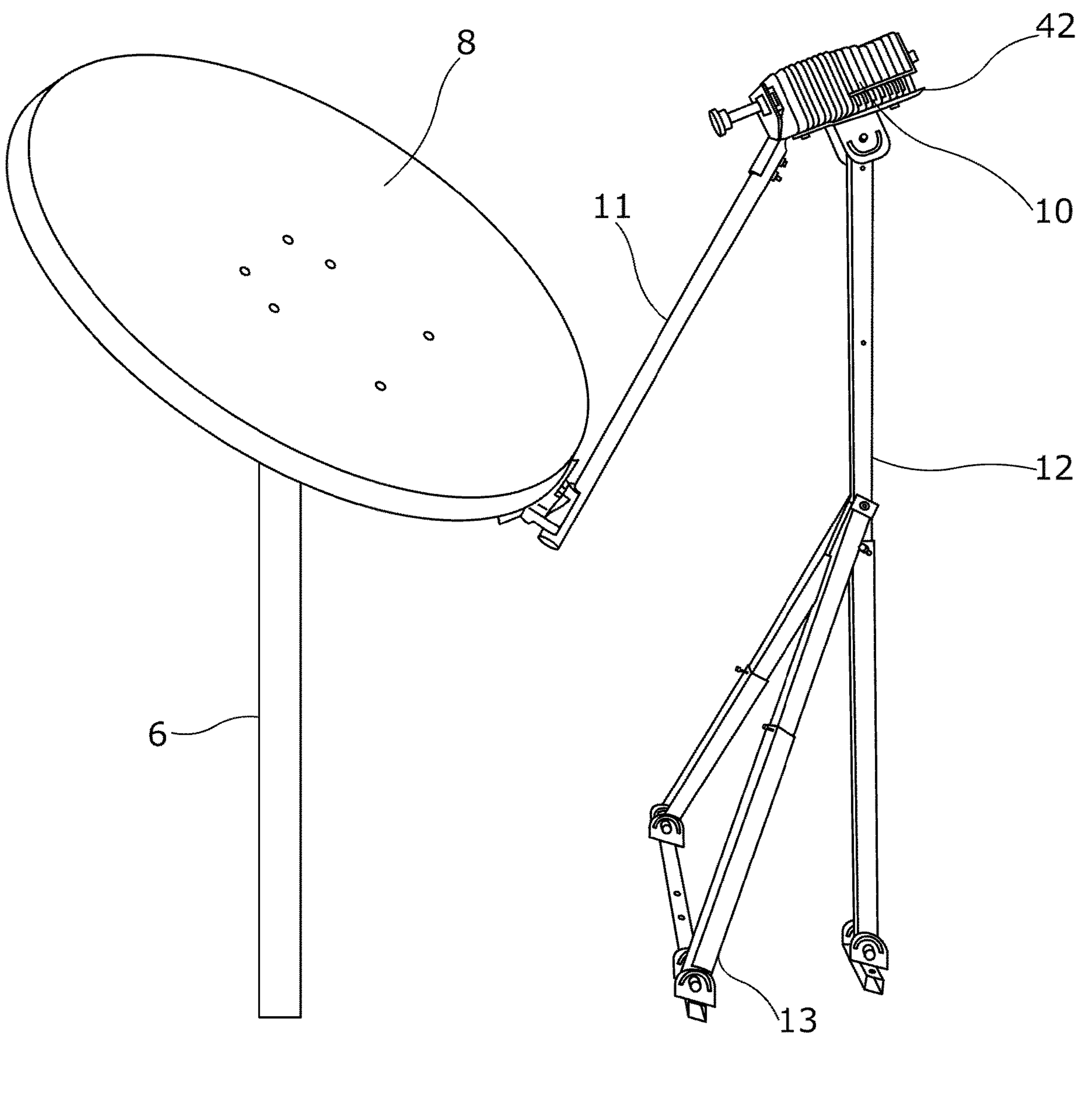
Figures 2A, 2B, 2C, 2D, 3A, 3B:
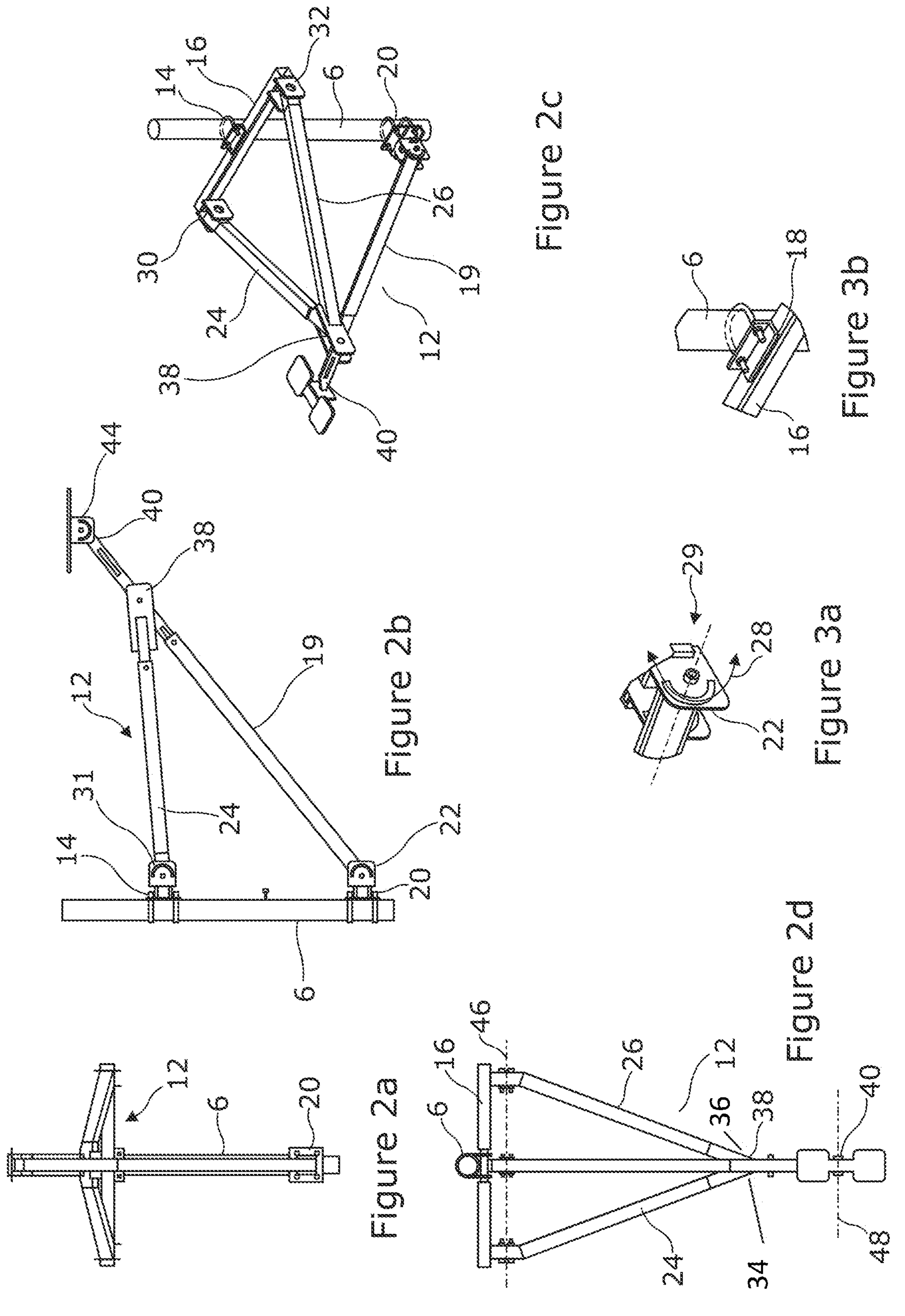

Specific embodiments of the invention are now described with reference to the accompanying drawings, wherein:

FIGS. 1*a-d* illustrates an antenna assembly in accordance with one embodiment of the invention;

FIGS. 2*a-d* illustrate the support structure of FIGS. 1*a-d* in various views; and FIGS. 3*a* and *b* illustrate fixing assemblies of the first member of the support structures Referring firstly to FIG. 1*c* there is illustrated an antenna assembly 2 for mounting with a support means 6 which can be a fixed structure such as in the form of a wall of a building, a pole, base and/or ground surface or any combination of the same. The antenna assembly includes a mounting means 4 provided to be attached to, or provided integrally with, the support means which, in the embodiment shown in FIG. 1*c*, is in the form of a pole 6. The pole 6 can already be attached to a wall of a building or be subsequently attached, or can be provided with base feet 9. The antenna assembly also includes an antenna dish 8, and data processing means components 10 located to the front of the antenna dish 8 on a support arm 11.

In accordance with the invention, the data processing means 10 are located and retain in position with the engagement of a support structure 12. FIG. 1*a* illustrates the arrangement between part of the support structure and the data processing means 10 in greater detail. The support structure 12 is shown in more detail in FIGS. 2*a*-3*b*. The support structure, in this embodiment, is fixed to the support means and in the embodiment shown in FIG. 1*b* is fixed to the pole 6, or may be located on the pole 6 and base 9 as shown in FIG. 1*c* or may be located on the support means in the form of the ground surface as shown in FIG. 1*d*.

The relative position of the support structure 12 is used to retain the position and orientation of the data processing means 10 with respect to the front surface of the antenna dish 8. The support structure 12 allows relatively heavy data processing means components 10 to be supported and retained in the selected position, and which otherwise may be problematic if the support arm 11 alone is not sufficiently strong or is prone to alter position or sag during use or under wind loading.

In FIG. 1*b* the support structure is shown in a position so as to provide the data processing components 10 in the required position with respect to a relatively low antenna dish elevation. In FIG. 1*d* the support structure 12 is shown in position for the data processing components 10 to be located in the required position for an "average" or "intermediate" antenna dish elevation, and in FIG. 1*d* the support structure is shown so as to locate the data processing components in the required position for a relatively high antenna dish elevation. The particular elevation which is selected can be determined by the geographical location of use and/or the particular location of the one or more satellites from which the data is to be received by the antenna assembly The support structure is shown in more detail in FIGS. 2*a*-3*b* and in this embodiment, in engagement with support means in the form of the pole 6. The support structure has a first location point 14 at which a first member 16 is located to the support means pole 6 via a first fixing assembly 18 which is also shown in detail in FIG. 3*b*. A second member 19 is provided at second location point 20 via a second fixing assembly 22 which is shown in more detail in FIG. 3*a*. The second fixing assembly permits rotational movement of the second member 19 with respect to the pole 6 as indicated by arrow 28 about axis 29.

The fixing assemblies 18,22 can be located on the pole at the spaced apart locations using engagement means in the form of a V- or U-shaped member which pass around the pole and securing nuts which engage a clamping plate to the member and secure the same to the pole.

The first member 16 is provided in a fixed location with respect to the pole and at opposing ends of the first member there are engaged a third member 24 and fourth member 26, respectively. These members are pivotally movable about axis 31 with respect to the first member via fixing assemblies 30, 32.

The ends 34, 36 of the third and fourth members engage with an adjustment mechanism 38 and at which the second member is slidingly engaged. The end 40 of the second member is provided with a locator 42, in this embodiment in the form of a plate as shown in FIG. 1*a* and on which the selected data processing components 10 for the antenna assembly are engaged, typically before installation of the assembly on the support pole 6. The locator position is adjustable with respect to the second member via fixing assembly 44 so that the position of the locator 42 and hence the data processing components 10 fixed thereto is adjustable at axes 46, 48. The range of possible sliding movement of the second member with respect to the adjustment mechanism 38 is selected to ensure that the required range of movements about the axes 46, 48 can be achieved.

The free end of the arm 11 is engaged with the data processing means components 10 so that the locator plate 42, support arm 11 and data processing means components 10 are mutually engaged and supported in position and therefore provide more reliable positioning and hence operation of the data processing components during use of the antenna assembly.

The invention in accordance with this application therefore provides apparatus and a method for securely mounting an antenna assembly with respect to a support means, said antenna assembly including a mounting means, antenna dish, support arm and data processing means. The invention provides a support structure which is selectively configurable to provide support for the data processing means position with respect to the antenna dish and thereby allow the subsequent processing of the received data to be retained at a preferred position for efficient data processing over time and thereby retain the quality of the data for the end user.

The invention claimed is:

1. An apparatus said apparatus comprising:

an antenna assembly including an antenna dish and mounting means thereof, data processing means in the form of any one, or any combination of, a waveguide, low noise block, block up convertor, transceiver and feedhorn, located at a selected position in front of said antenna dish to allow the receipt and processing of data signals reflected from said antenna dish; and the data processing means being located with respect to a support arm; and a support structure in engagement with the data processing means and/or support arm and a support means for the antenna assembly to provide support for a position of the support arm and the data processing means located thereon, the support structure includes first and second spaced apart members, the first member includes third and fourth members depending outwardly therefrom to intersect at an adjustment mechanism, and wherein a relative sliding member of the second member with respect to the adjustment mechanism and the third and the fourth members is possible.

2. The apparatus according to claim 1 wherein the support means are engaged with the mounting means for the antenna assembly.

3. The apparatus according to claim 2 wherein the support structure is located on the support means to be positionally adjustable independently of said mounting means.

4. The apparatus according to claim 1 wherein, extending from the adjustment mechanism is a locator for the data processing means.

5. The apparatus according to claim 4 wherein the locator is provided on a first side of the adjustment mechanism and the first, third and fourth members are provided to the opposing side of the adjustment mechanism.

6. The apparatus according to claim 1 wherein the first and second members are provided at fixed locations on the support means and adjustment is possible between the first, third and fourth members respectively.

7. The apparatus according to claim 1 wherein the support structure includes locking means at least at the adjustment mechanism to allow the support structure, once adjusted to a required position for subsequent use, to be locked in that condition.

8. The apparatus according to claim 1 wherein the support arm engages with one or more of the data processing means and the locator of the support structure.

9. The apparatus according to claim 1 wherein the support means is any, or any combination of a pole, base, ground surface or other fixed object.

* * * * *